No. 874,522.　　　　　　　　　　　　　　　　　PATENTED DEC. 24, 1907.
T. A. MARTIN.
ANIMAL SHEARS.
APPLICATION FILED JUNE 15, 1907.
2 SHEETS—SHEET 1.
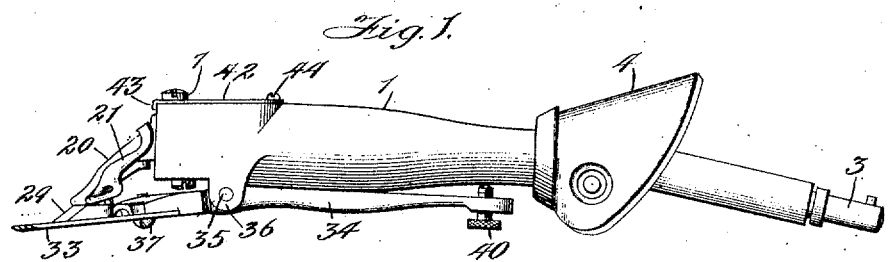
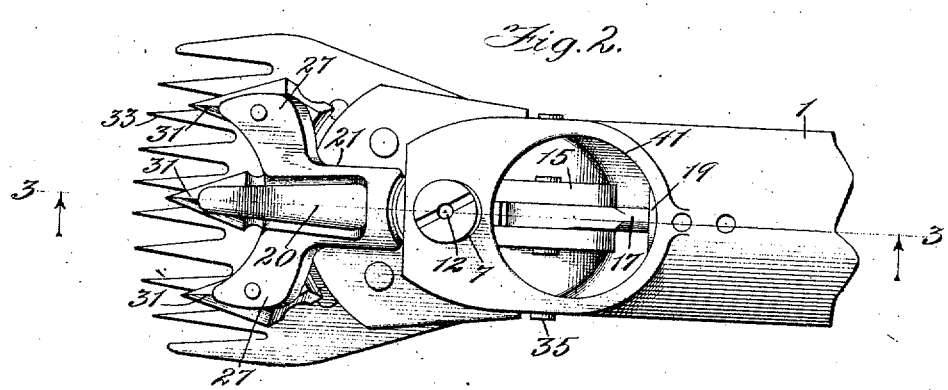
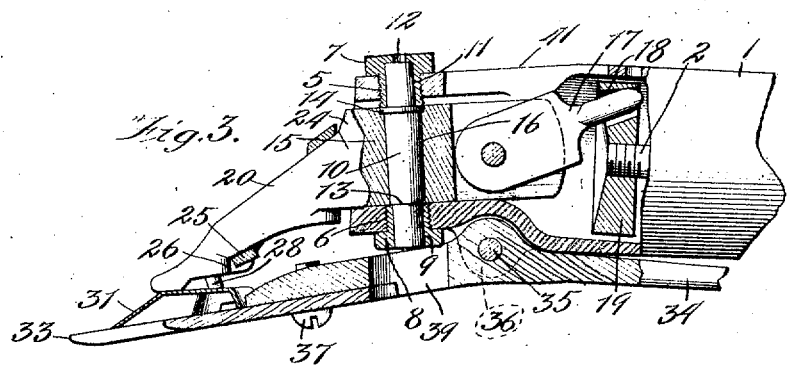
Witnesses:　　　　　　　　　　　　　　　　　Inventor:
Ira D. Perry　　　　　　　　　　　　　　　　Thomas A. Martin
Jno. H. Nelson Jr.　　　　　　　　　　　　By Luther L. Miller
　　　　　　　　　　　　　　　　　　　　　　　Atty.

No. 874,522.    PATENTED DEC. 24, 1907.
T. A. MARTIN.
ANIMAL SHEARS.
APPLICATION FILED JUNE 15, 1907.

2 SHEETS—SHEET 2.

Witnesses:
Ia D. Perry
Jno H Nelson Jr

Inventor
Thomas A. Martin
By Luther L. Miller
Atty.

UNITED STATES PATENT OFFICE.

THOMAS ARTHUR MARTIN, OF CHICAGO, ILLINOIS, ASSIGNOR TO DAVIS-MARTIN COMPANY, OF CHICAGO, ILLINOIS, A CORPORATION OF ILLINOIS.

ANIMAL-SHEARS.

No. 874,522.   Specification of Letters Patent.   Patented Dec. 24, 1907.

Application filed June 15, 1907. Serial No. 379,108.

*To all whom it may concern:*

Be it known that I, THOMAS ARTHUR MARTIN, a citizen of the United States, residing at Chicago, in the county of Cook and State of Illinois, have invented certain new and useful Improvements in Animal-Shears, of which the following is a specification.

One of the objects of this invention is the production of an animal shears having an improved means for adjusting the cutters. This object I accomplish by providing means for moving the stationary cutting element or "comb" toward or away from the movable cutting element.

Another object is to provide an improved bearing for the movable cutting element.

The invention also relates to the other improvements in animal shears hereinafter set forth.

Figure 4:
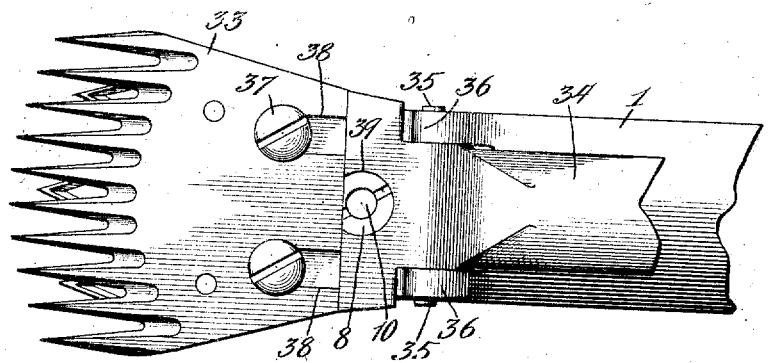
Figure 5:
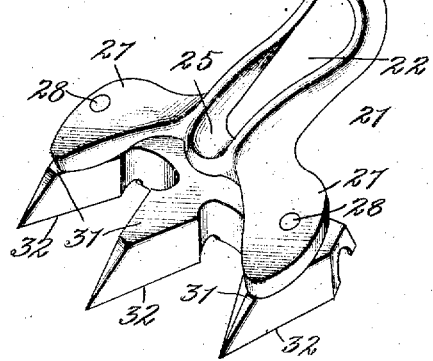
Figure 6:
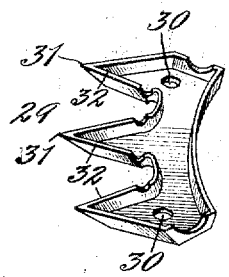

In the accompanying drawings, Figure 1 is a side elevation of an animal shears embodying the features of my invention. Fig. 2 is a top plan view of the forward portion of said animal shears, on an enlarged scale. Fig. 3 is a longitudinal vertical central section through the forward portion of the shears. Fig. 4 is an underside view of the forward end of the device. Fig. 5 is a perspective view of the movable cutting element and the member that connects it with the actuating lever. Fig. 6 is a perspective view showing the under side of the movable cutting element.

The present embodiment of the invention belongs to the class of animal shears in which the cutter is driven from a motor separate from the shears, as distinguished from the type of animal shears which comprises a motor within itself. However, it will be apparent that certain features of the invention are applicable to animal shears of any form of drive.

1 indicates a casing of convenient size and form to be held in the hand of the operator. In said casing is rotatably mounted a drive shaft 2 (Fig. 3) operatively connected at its forward end to the cutter mechanism and geared or otherwise suitably connected at its rear end to a member 3 adapted to be attached to flexible shafting (not shown) by means of which power is communicated to the shears from any suitable source. A shield 4 of leather or other suitable material is provided to partially inclose the gear connection between the shaft 2 and the member 3. In the upper and lower walls near the open forward end of the casing 1 are formed two alined screw-threaded openings 5 and 6. Within these openings are located bearing screws 7 and 8, respectively. The screw 8 has a bearing opening 9 therein adapted to receive the lower end of the pivot pin 10 for the member that supports the movable cutting element. The bearing screw 7 has a socket 11 therein for the reception of the upper end of said pivot pin. 12 is an opening in the upper end of the bearing screw 7 through which lubricant may be introduced into the socket 11. The lower end of the pivot pin 10 is slightly reduced in diameter, forming a shoulder 13. Upon the upper portion of the pivot pin is formed an annular flange or collar 14.

The lever 15 for the movable cutter has an opening 16 therein through which the pivot pin 10 extends. Preferably the pin 10 is fixed to the lever 15, as by making the pin slightly tapered and driving it into its opening, the collar 14 limiting its downward movement. The rear end of the lever is operatively connected with the drive shaft 2 in any suitable way, as by pivotally mounting a pin 17 in the bifurcated rear end of said lever, the free end of said pin lying loosely within a tapered opening 18 in a disk 19 fixed to the forward end of said shaft. The forward end of the cutter lever 15 is in the form of a finger 20 upon which is mounted a holder 21 (Fig. 5) having an elongated opening 22 therein through which said finger extends. The portion 23 of said holder lies across the upper side of the finger 20, and in front of a shoulder 24 upon said finger. The portion 25 of the holder passes under said finger and lies behind the shoulder 26 thereon. Said shoulders prevent any considerable movement of the holder 21 longitudinally of the finger 20, but allow a little play. The finger 20 passes freely through the opening 22. The connection just described between the finger 20 and the holder 21 allows the parts to accommodate themselves to the pressure placed upon them in operation. The holder 21 comprises wings 27 lying one at each side of the finger 20, each of said wings having a downwardly-extending stud 28 fixed thereto. The movable cutting element 29 (Fig. 6) consists, in this instance, of a sheet metal stamping having two openings 30 therein through which the pins 28 extend. The cutting element 29 comprises three blades 31 each provided with two shearing edges 32. The forward ends of the wings 27 and the finger 20 bear upon said blades and hold the same to their work.

The stationary cutting element or comb 33 is carried upon the forward end of a lever 34 pivotally mounted upon a pin 35, said pin extending through ears 36 upon the under side of the casing 1. The comb 33 is adjustably secured to the under side of the forward end of the lever 34 by means of screws 37, said screws extending through notches 38 formed in the rear end of the comb. An opening 39 is formed in the lever 34 to afford access to the bearing screw 8. The lever 34 extends rearwardly of its pivot 35 to a point near the rear end of the casing 1, and is there provided with an adjusting screw 40 adapted to bear upon the adjacent portion of said casing. By means of the screw 40 the lever 34 may be tilted to hold the comb 33 in operative relation with the cutting element 29. As the cutters wear the screw 40 is adjusted to hold said cutting elements together with the degree of pressure necessary to permit of proper shearing action. The pivot 35 for the lever 34 is so far removed from the operating portion of the comb 33 that the adjusting movement of said comb is substantially a rectilinear movement toward and away from the cutting element 29. An opening 41 is formed in the upper wall of the casing 1 near the forward end thereof to give access to the mechanism in said casing and to permit of supplying lubricant thereto. This opening is kept covered during the operation of the machine by a cap 42. Said cap is held in place by means of a flange 43 thereon fitting over the forward end of the casing 1, and by a screw 44.

In operation, the rotation of the disk 19 causes the lever 15 and the cutting element 29 to be oscillated. The comb 33 is adjusted to provide proper contact between the cutting elements by means of the screw 40. The comb-adjusting means holds the comb positively and unyieldingly against the cutting element 29. When it is desirable to sharpen the cutter 29 the comb 33 is removed from the lever 34, whereupon the cutter 29 drops out of the machine.

While I have described in some detail a specific embodiment of my invention which I deem to be new and advantageous in the details of construction, I do not desire to be understood as limiting myself in respect to the broader features of my invention to the specific construction shown and described.

I claim as my invention:

1. In an animal shears, in combination, a supporting member; a movable cutter; a lever pivoted to said supporting member; a stationary cutter carried by said lever; and means for adjusting the position of said lever.

2. In an animal shears, in combination, a supporting member; a movable cutter; a lever pivoted to said supporting member at a point between its ends; a cutting element carried at one end of said lever; and an adjusting means carried at the other end of said lever.

3. In an animal shears, in combination, a supporting member; a movable cutter; a lever pivoted to said supporting member at a point between the ends of said lever; a cutter carried at one end of said lever; and an adjusting screw mounted in the other end of said lever.

4. In an animal shears, in combination, a casing adapted to be held in the hand of the operator; a movable cutter; means in said casing for moving said movable cutter; a lever pivoted at a point between its ends near the forward end of said casing, one end of said lever extending to a point near the rear end of said casing; an adjusting screw in said end of said lever adapted to bear upon an adjacent portion of the casing; and a stationary cutting member carried at the other end of said lever.

5. In an animal shears, in combination, a supporting member; a lever pivotally mounted therein; means for pivotally moving said lever, said lever comprising a forwardly-extending finger; a member mounted upon said finger; a cutting element attached to said last mentioned member; a stationary cutting element; and means for pressing said stationary cutting member against said first mentioned cutting element.

6. In an animal shears, in combination, a supporting member; a lever pivotally mounted in said supporting member; means for pivotally moving said lever, said lever comprising a finger having shoulders thereon; a member mounted upon said finger between said shoulders; a cutting element attached to said last mentioned member; a stationary cutting element; and means for pressing said stationary cutting element against said first mentioned cutting element.

7. In an animal shears, in combination, a supporting member; a lever pivotally mounted therein; means for pivotally moving said lever, said lever comprising a finger; a member mounted on said finger, said member comprising two wings having pins fixed thereto; a cutting member having openings therein into which said pins extend; a stationary cutting member; and means for pressing said stationary cutting member against said first mentioned cutting member.

8. In an animal shears, in combination, a supporting member; a lever pivotally mounted in said supporting member; means for pivotally moving said lever, said lever comprising a finger having shoulders thereon; a member fitting over said finger between said shoulders, said member comprising wings lying at opposite sides of said finger, said wings having pins fixed thereto; a cutting member having openings therein into which said pins extend, said wings and said finger bearing upon said cutting member; a stationary cutting member; and means for pressing said cutting member against said first mentioned cutting member.

9. In an animal shears, in combination, a supporting member; a lever pivotally mounted therein, said lever comprising a forwardly-extending finger; a member mounted upon said finger; a cutting element attached to said last mentioned member; a stationary cutting element; and means for pivotally moving said lever.

10. In an animal shears, in combination, a supporting member; a lever pivotally mounted in said supporting member and comprising a finger having shoulders thereon; a member mounted upon said finger between said shoulders; a cutting element attached to said last-mentioned member; a stationary cutting element, and means for pivotally moving said lever.

11. In an animal shears, in combination, a supporting member; a lever pivotally mounted therein and comprising a finger; a member mounted on said finger and comprising two wings having pins fixed thereto; a cutting member having openings therein in which said pins extend; a stationary cutting member; and means for pivotally moving said lever.

THOMAS ARTHUR MARTIN.

Witnesses:
C. PAUL PARKER,
GEORGE L. CHINDAHL.